UNITED STATES PATENT OFFICE.

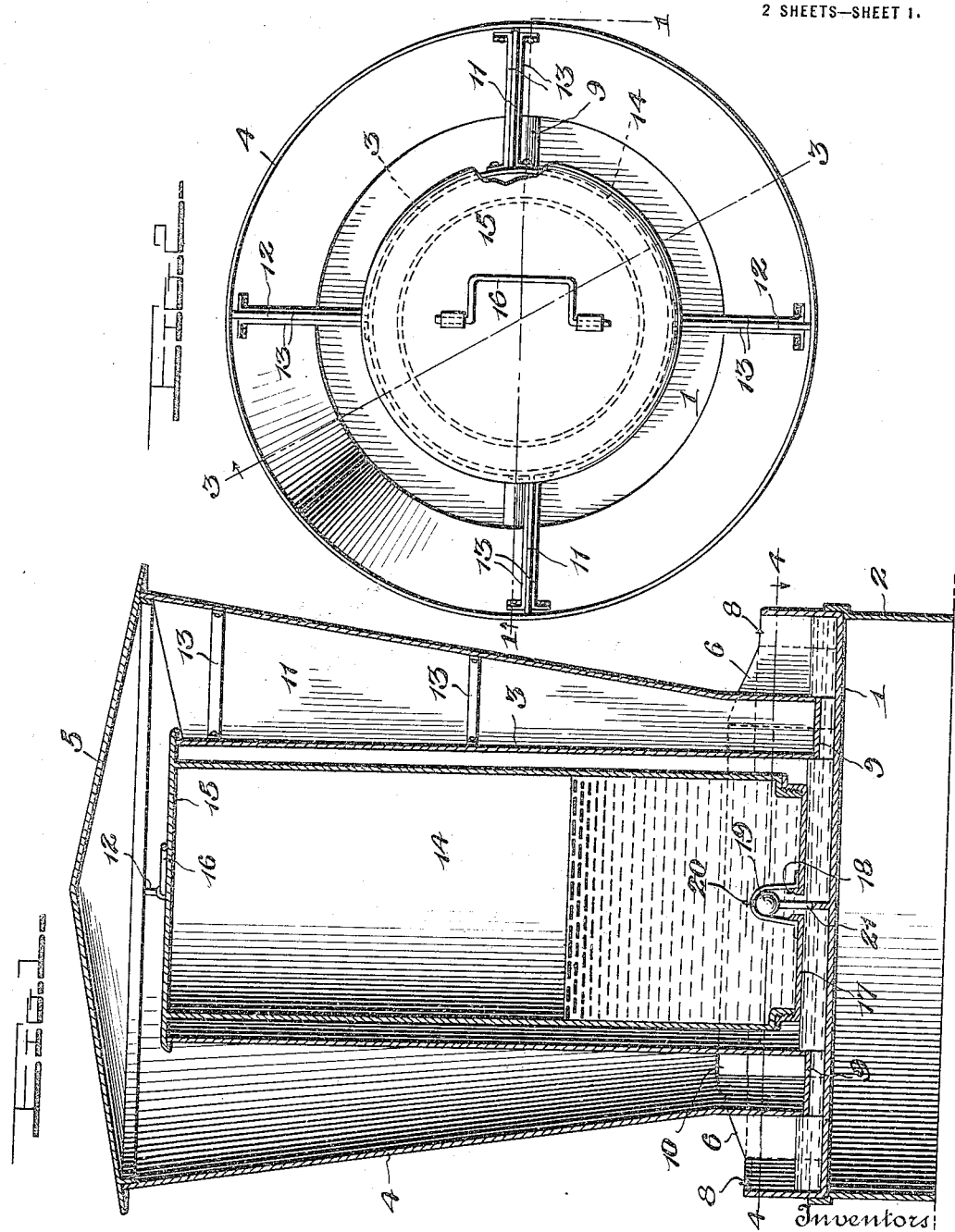

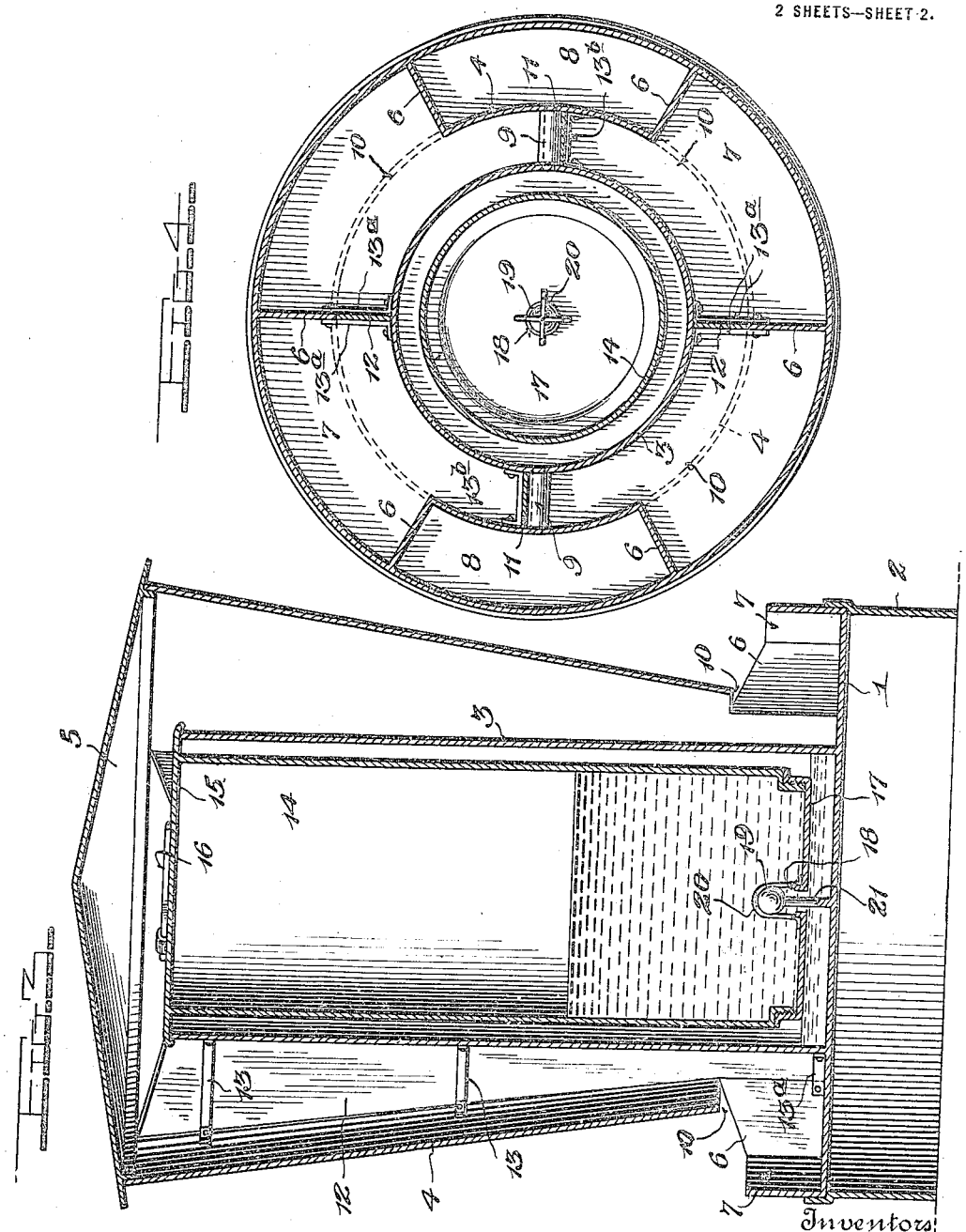

GEORGE W. BEACH, OF SAYBROOK, CONNECTICUT, AND CLAYTON VON CULIN, OF NEW YORK, N. Y.

COMBINED POULTRY FEEDER AND DRINKING-FOUNTAIN.

1,254,193.  Specification of Letters Patent.  Patented Jan. 22, 1918.

Application filed October 2, 1916. Serial No. 123,370.

*To all whom it may concern:*

Be it known that we, GEORGE W. BEACH and CLAYTON VON CULIN, citizens of the United States, residing, respectively, at Saybrook, county of Middlesex, State of Connecticut, and New York, in the county of New York and State of New York, have invented certain new and useful Improvements in Combined Poultry Feeders and Drinking-Fountains; and we do declare the following to be a full, clear, and exact description of the invention, such as will enable others skilled in the art to which it appertains to make and use the same.

Our invention aims to provide a simply constructed and inexpensive yet efficient and durable device for use on poultry farms for the purpose of supplying both feed and water to chickens and other poultry.

A further object is to locate the water supply tank within the feed hopper so that the feed around the former will serve to protect it against both heat and cold.

With the foregoing general objects in view, the invention resides in certain novel features of construction and in unique combinations of parts to be hereinafter fully described and claimed, the descriptive matter being supplemented by the accompanying drawings which constitute a part of this application and in which:

Figure 1 is a vertical section through the improved device taken on the plane indicated by the line 1—1 of Fig. 2;

Fig. 2 is a top plan view with the hopper cover removed;

Fig. 3 is another vertical section on the plane of the line 3—3 of Fig. 2;

Fig. 4 is a horizontal section on the plane of the line 4—4 of Fig. 1.

In the drawings above briefly described, the numeral 1 refers to a circular pan which may or may not be supported on a base 2, according to requirements. A continuous vertical wall 3 rises centrally from the bottom of the pan, and forms therewith a cylindrical water tank while a continuous hopper wall 4 rises from said bottom of the pan around the wall 3, said wall 4 being preferably but not necessarily frusto-cone shaped. A suitable cover 5 rests on the wall 4 as shown to exclude rain and deleterious matter.

A plurality of radial partitions 6 extend between the lower end of wall 4 and the circular side of pan 1 and divide said pan into feed pockets or compartments 7 and a pair of water pockets or compartments 8, the latter being in communication with the water tank by means of tubular passage members 9 while notches 10 in the lower edge of the wall 4 establish communication between the compartments 7 and the space between the walls 3 and 4. A pair of vertical partitions 11 extend between the walls 3 and 4 and at their lower ends are located adjacent the inner sides of the compartments 8 while other partitions 12 are interposed between the inner edges of certain of the partitions 6 and the wall 3 as shown clearly in Figs. 3 and 4. The upper and intermediate portion of all of the partitions 11 and 12 are received slidably between parallel radially disposed bars or the like 13 secured at their ends to the walls 3 and 4. The lower ends of the partitions 12 are preferably received between bars $13^a$ similar to 13 while the lower ends of the partitions 11 are disposed between the passage members 9 and other bars $13^b$ spaced therefrom (see more particularly Figs. 3 and 4).

By mounting the partitions 11 and 12 in the manner described, they may be withdrawn when the cover 5 is removed should this be required, but in most cases said partitions are used to divide the space around the water tank into a plurality of compartments which will contain feed, charcoal, grit, etc.

A water reservoir 14 is disposed in the tank formed by the wall 3, said reservoir having a solid closed top 15 provided with a handle 16 by means of which it may be raised and carried from place to place. The bottom 17 of the reservoir 14, however, is removable, being preferably threaded on said reservoir as shown in Figs. 1 and 3. The bottom 17 is formed with a central valve seat 18 upon which a ball valve 19 may rest to prevent the discharge of water from the reservoir 14 when the latter is being carried to the feeder, inserted therein or removed therefrom, said valve being mounted in a suitable cage 20. A vertical pin 21 rises from the bottom of the pan 1 and when the reservoir 14 is inserted in the water tank said pin raises the valve 19 so that the water may flow from the reservoir into the tank and from the latter through the passage members 9 into the water compartments 8. When the supply of water in these compartments has been sufficiently diminished to permit air to enter the upper end of the reservoir 14 through the valve seat 18, the entrance of such air will permit more water to discharge but the moment said seat is again sealed, the supply of water will be checked since no air can enter the reservoir to relieve the partial vacuum in the upper end thereof.

By constructing the combined feeder and drinking fountain in the manner shown and described, it will not only be simple and inexpensive but will be highly efficient through the numerous seasons, the supply of feed and the like around the water tank 3 serving to prevent heating of the water in hot weather and freezing thereof in the colder months, this being a highly advantageous feature. Emphasis is also laid on the removable bottom 17 of the reservoir 14 since this bottom is of such size as to permit the interior of said reservoir to be readily cleansed and thus kept in a sanitary condition.

In the drawings, a number of specific details of construction have been shown for illustrative purposes, and in the preceding such details have been described but it is to be understood that within the scope of the invention as claimed, numerous changes may be made without sacrificing the principal advantages.

We claim:

A poultry feeding and watering device comprising a pan having a hopper wall rising therefrom, a water tank within said wall, and partitions extending across the space between said hopper wall and the pan wall to divide said space into feed and water pockets, said water pockets communicating with said tank and said hopper wall having notches in its lower end extending between said water pockets to place the feed pockets in communication with the space between said tank and the hopper wall, certain of said partitions extending vertically across said notches; in combination with removable partitions in said space between the tank and hopper walls and abutting the inner edges of said last named partition.

In testimony whereof we have hereunto set our hands in the presence of two subscribing witnesses.

GEORGE W. BEACH.
CLAYTON VON CULIN.

Witnesses:
GILES A. BUSHNELL,
WILLIAM R. BUSHNELL.